(12) United States Patent
Iwase et al.

(10) Patent No.: US 7,776,949 B2
(45) Date of Patent: Aug. 17, 2010

(54) WATER-BASED COATING MATERIAL

(75) Inventors: Toshihiro Iwase, Owariasahi (JP);
Takayoshi Takahira, Aichi-gun (JP);
Tetsuo Gotou, Ichinomiya (JP)

(73) Assignee: Aisin Kako Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 12/349,353

(22) Filed: Jan. 6, 2009

(65) Prior Publication Data
US 2009/0186974 A1 Jul. 23, 2009

(30) Foreign Application Priority Data
Jan. 18, 2008 (JP) ............................. 2008-008835
Nov. 21, 2008 (JP) ............................. 2008-297706

(51) Int. Cl.
*C08K 3/22* (2006.01)
(52) U.S. Cl. ..................................... 524/432
(58) Field of Classification Search .................. 524/432
See application file for complete search history.

(56) References Cited

U.S. PATENT DOCUMENTS
3,999,957 A * 12/1976 Tongyai ....................... 428/626

FOREIGN PATENT DOCUMENTS
JP 11-241048 A 9/1999
JP 2006-291014 A 10/2006

* cited by examiner

*Primary Examiner*—Robert D. Harlan
(74) *Attorney, Agent, or Firm*—Sughrue Mion, PLLC

(57) ABSTRACT

In a water-based coating material, to be able to obtain a tough film having an excellent corrosion resistance even if an additive amount of zinc oxide particles is reduced less than that of conventional ones and obtain a tougher film having a much excellent corrosion resistance by coupling a great amount of carboxyl groups to a surface of zinc oxide particles when making the additive amount of zinc oxide particles equal to that of conventional ones.

Each of evaluation items covering hardness, adhesion, corrosion resistance, water resistance of a film being formed by applying a water-based coating material, and storage stability of the water-based coating material, which was manufactured using zinc oxide particles having a great amount of asperities on a surface and a large specific surface area produced by comprising the steps of mixing a water-soluble zinc material and an alkali material to react, and then performing water washing so as to remove impurities in a product, dehydrating, drying, burning, and pulverizing to classify it, is greater than those of the conventional water-based coating material manufactured using zinc oxide particles having a normal specific surface area.

14 Claims, 1 Drawing Sheet

WATER-BASED COATING MATERIAL

BACKGROUND OF THE INVENTION

1. Field of the Invention

This invention relates to a water-based coating material having corrosion resistance composed mainly of an organic synthetic resin having a carboxyl group and zinc oxide particles. More specifically, this invention relates to a water-based coating material that can reduce usage of zinc oxide particles.

2. Description of the Related Art

In recent years, in paint used for coating a surface of a vehicle and the like, shift to water base paint has been advanced in order to reduce a volatile organic compound (VOC) from an environmental viewpoint. In addition, in anticorrosive paint, it is required to depart from paint using a corrosion inhibitor which contains a harmful heavy metal such as a conventional chromium-based corrosion inhibitor and a lead-based corrosion inhibitor from a viewpoint of global environmental protection. Japanese Patent Publication No. (Heisei) 11-241048 shows an invention of a water base paint composition as an example of water base paints having corrosion resistance without using a corrosion inhibitor which contains such a harmful heavy metal.

The Japanese Patent Publication No. (Heisei) 11-241048 discloses the invention of the water based paint composition containing 0 to 50 parts by weight of at least one chromium-free anticorrosive pigment selected from zinc compounds and molybdic acid compounds and 5 to 50 parts by weight of at least one type of calcium ion-exchanged amorphous silica fine particles relative to 100 parts by weight of the total amount of a film-forming resin component comprising 50 to 100 parts by weight of at least one water soluble resin selected from water-soluble alkyd resins and water-soluble epoxy ester resins, 0 to 50 parts by weight of at least one water-soluble acrylic resin and 0 to 30 parts by weight of at least one water-soluble melamine resin. This allows for providing a water base paint that can form a film having an excellent anticorrosion property on an aluminum-coated steel sheet without using a corrosion inhibitor which contains a harmful heavy metal.

However, in the techniques described in the above Japanese Patent Publication No. (Heisei) 11-241048, the film being formed therein is not so tough that it has disadvantages of being easy to peel and fragile even though it has the excellent anticorrosion property. Thus, in paint containing an organic synthetic resin having a carboxyl group and zinc oxide particles, the fact that the carboxyl group forms a three-dimensional structure and a tough film by reacting with zinc oxide particles has attracted attention.

As an example of paints containing such an organic synthetic resin having a carboxyl group and zinc oxide particles, Japanese Laid Open Patent Publication No. 2006-291014 describes an invention on an anticorrosive paint wherein it permits preserving a metallic luster of a laminar film and obtaining an anticorrosive paint having a high adhesive property to a plastic material by containing metallic oxide particles having a particle size of 20 to 50 nm, an acrylic-type resin and a silane coupling agent.

However, in the techniques described in the above Japanese Laid Open Patent Publication No. 2006-291014, ultrafine metallic oxide particles having a particle size of 20 to 50 nm (which is an average particle size calculated based on an arithmetic average) are used to preserve the metallic luster of the laminar film and ensure transparency, and thus manufacturing cost is considerably increased, and the laminar film is fragile because of difficulty in forming a thick film and it is unable to obtain a tough film therein. On the other hand, when using zinc oxide particles having a particle size about 0.1 to 1 μm (which is an average particle size measured with a laser diffraction-type particle size distribution measuring apparatus), the carboxyl group increases an area to react with zinc oxide particles and it is required to increase the additive amount of zinc oxide particles, and thus there is a problem of cost increase also.

Accordingly, an object of the present invention is to provide a water-based coating material composed mainly of an organic synthetic resin having a carboxyl group and zinc oxide particles which permits obtaining a tough film having an excellent corrosion resistance even if an additive amount of zinc oxide particles is reduced less than that of conventional ones and permits obtaining a tougher film having a much excellent corrosion resistance by coupling more carboxyl groups to a surface of zinc oxide particles when making the additive amount of zinc oxide particles equal to that of conventional ones.

BRIEF SUMMARY OF THE INVENTION

According to a first aspect of the invention, there is provided a water-based coating material which contains an organic synthetic resin having a carboxyl group, zinc oxide particles, water as a solvent and a pigment, wherein the zinc oxide particles have a specific surface area within a range of 20 to 60 square meters per gram (m2/g).

Here, various organic synthetic resins including emulsion such as an epoxy ester resin, an acrylic resin (including a methacrylic resin), a polyurethane resin, and a polyester resin can be used as the "organic synthetic resin having a carboxyl group". In addition, carbon black and so on as a colored pigment, and talc, calcium carbonate, barium sulfate, calcium sulfate, diatomaceous earth, clay, mica, and so on as an extender pigment can be used as the "pigment".

According to a second aspect of the invention, in composition of claim 1, there is provided a water-based coating material that the organic synthetic resin having a carboxyl group is an epoxy ester resin, an acrylic resin emulsion, a polyurethane resin or a polyester resin.

According to a third aspect of the invention, in either one of compositions of claim 1 and claim 2, there is provided water-based coating material that further contains glycols such as propylene glycol, diethylene glycol, and butyl cellosolve or amines such as triethylamine and dimethylethanolamine.

Here, propylene glycol monoether, diethylene glycol monoether, propylene glycol ether acetate, diethylene glycol ether acetate, and so on including propylene glycol, diethylene glycol, and butyl cellosolve can be used as the "glycols". In addition, aqueous solution of ammonia and so on including triethylamine and dimethylethanolamine can be used as the "amines".

According to a forth aspect of the invention, in any one of compositions of claim 1 to claim 3, there is provided a water-based coating material that further contains a corrosion inhibitor effective in an initial stage. Here, aliphatic acid, alkanolamine, carboxylic acid-amine complex, and so on can be used as the "corrosion inhibitor effective in an initial stage".

According to a fifth aspect of the invention, in any one of compositions of claim 1 to claim 4, there is provided a water-based coating material wherein the organic synthetic resin having a carboxyl group, the zinc oxide particles, and the water as a solvent are contained in an amount ranging from 40 to 70% by weight, 3 to 10% by weight, and 5 to 20% by weight, respectively, in the water-based coating material.

According to the first aspect of the invention, there is provided a water-based coating material which contains an organic synthetic resin having a carboxyl group, zinc oxide particles, water as a solvent, and a pigment, wherein zinc oxide particles have a specific surface area within a range of 20 to 60 m2/g.

As a result of an accomplishment of keen and hard experimental study on an appropriate value of a specific surface area of zinc oxide particles in water-based coating materials composed mainly of an organic synthetic resin having a carboxyl group and zinc oxide particles by the inventors, they have finally found that it permits obtaining a water-based coating material having corrosion resistance that can reduce an additive amount of zinc oxide particles to lower the cost and form a tougher film when zinc oxide particles have a specific surface area within a range of 20 to 60 m2/g, and they have completed the invention on the basis of this knowledge.

More specifically, if zinc oxide particles have a specific surface area less than 20 m2/g, it is unable to obtain a tough film having a three-dimensional structure because there is too little reactive site of the carboxyl group in the organic synthetic resin having a carboxyl group. On the other hand, if zinc oxide particles have a specific surface area greater than 60 m2/g, it becomes harder to produce zinc oxide particles and brings even a higher cost, and it becomes harder to disperse it uniformly.

In contrast, by making zinc oxide particles have a specific surface area within a range of 20 to 60 m2/g, it permits easily producing and obtaining zinc oxide particles having a large specific surface area, and by having more reactive sites of the carboxyl group, it permits coupling more amounts of carboxyl groups to a surface of zinc oxide particles, and thus the additive amount of zinc oxide particles can be reduced to lower the cost.

Thus, there is provided a water-based coating material that permits obtaining a tough film having an excellent corrosion resistance even if the additive amount of zinc oxide particles is reduced less than that of conventional ones and obtaining a tougher film having a much excellent corrosion resistance by coupling more amounts of carboxyl groups to a surface of zinc oxide particles when making the additive amount of zinc oxide particles equal to that of conventional ones in the water-based coating material composed mainly of an organic synthetic resin having a carboxyl group and zinc oxide particles.

According to the second aspect of the invention, there is provided a water-based coating material that an organic synthetic resin having a carboxyl group is an epoxy ester resin, an acrylic resin emulsion, a polyurethane resin or a polyester resin.

As a result of an accomplishment of keen and hard experimental study on an appropriate sort of organic synthetic resins having a carboxyl group in the water-based coating material composed mainly of an organic synthetic resin having a carboxyl group and zinc oxide particles by the inventors, they have finally found that it permits obtaining a water-based coating material having corrosion resistance that can more certainly reduce the additive amount of zinc oxide particles to lower the cost and form a tougher film when using an epoxy ester resin, an acrylic resin emulsion, a polyurethane resin or a polyester resin, and they have completed the invention on the basis of this knowledge.

According to the third aspect of the invention, there is provided a water-based coating material that further contains glycols such as propylene glycol, diethylene glycol, and butyl cellosolve or amines such as triethylamine and dimethylethanolamine.

Here, propylene glycol monoether, diethylene glycol monoether, propylene glycol ether acetate, diethylene glycol ether acetate, and so on including propylene glycol, diethylene glycol, and butyl cellosolve can be used as the "glycols". In addition, aqueous solution of ammonia and so on including triethylamine and dimethylethanolamine can be used as the "amines".

By further containing glycols or amines, it permits obtaining a water-based coating material having corrosion resistance that can more certainly reduce the additive amount of zinc oxide particles to lower the cost and form a tougher film.

According to the forth aspect of the invention, there is provided a water-based coating material that further contains a corrosion inhibitor effective in an initial stage. Here, aliphatic acid, alkanolamine, carboxylic acid-amine complex, and so on can be used as the "corrosion inhibitor effective in an initial stage".

By further containing the corrosion inhibitor effective in an initial stage, it permits obtaining a water-based coating material having corrosion resistance that can more certainly reduce the additive amount of zinc oxide particles to lower the cost and form a tougher film.

According to the fifth aspect of the invention, there is provided a water-based coating material wherein an organic synthetic resin having a carboxyl group, zinc oxide particles, and water as a solvent are contained in an amount ranging from 40 to 70% by weight, 3 to 10% by weight, and 5 to 20% by weight, respectively, in the water-based coating material.

If the content of the organic synthetic resin having a carboxyl group is less than 40% by weight, it causes a reduction in the resin content and thus results in a decrease in an adhesive property as a water-based coating material. On the other hand, if the content of the organic synthetic resin having a carboxyl group is greater than 70% by weight, it causes a reduction in the content of zinc oxide particles, and thus an effect on film performance (an effect of forming a tough film) obtained using zinc oxide particles is too low to have utility. Accordingly, it is preferable that the additive amount of organic synthetic resin having a carboxyl group be within a range of 40 to 70% by weight.

In addition, if the content of zinc oxide particles is less than 3% by weight, an effect on film performance (an effect of forming a tough film) obtained using zinc oxide particles is too low to have utility. On the other hand, if the content of zinc oxide particles is greater than 10% by weight, it causes a reduction in the resin content and thus results in a decrease in an adhesive property as a water-based coating material. Accordingly, it is preferable that the content of zinc oxide particles be within a range of 3 to 10% by weight.

Furthermore, if the content of water as a solvent is less than 5% by weight, it is harder to disperse uniformly as a water-based coating material and becomes higher in a viscosity, and thus a working property is reduced. On the other hand, if the content of water as a solvent is greater than 20% by weight, water is too much, and thus the working property is also reduced. Accordingly, it is preferable that the content of water as a solvent be within a range of 5 to 20% by weight.

DETAILED DESCRIPTION OF THE INVENTION

Figure 1:
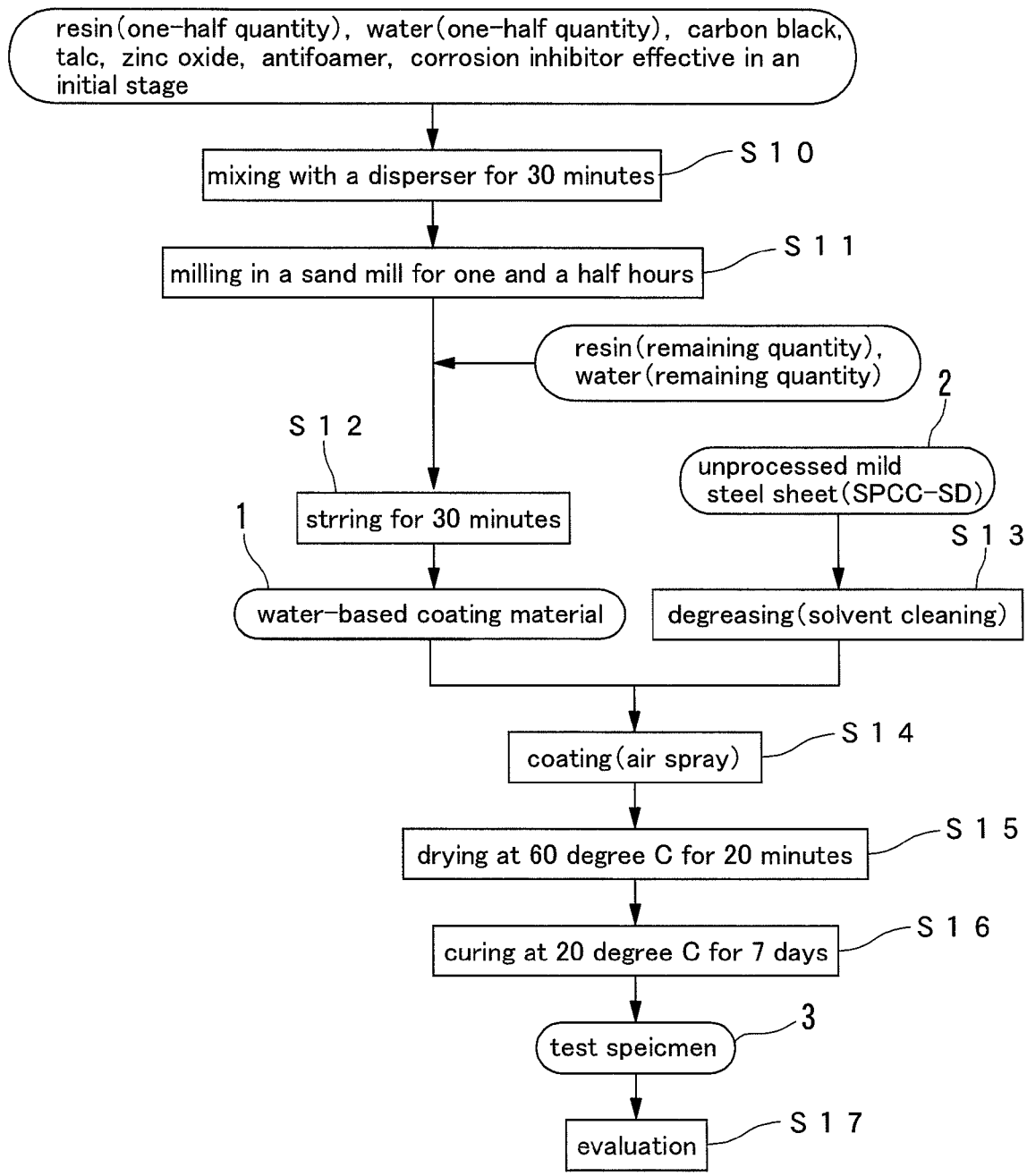
FIG. 1 is a flow diagram showing a manufacturing method of a water-based coating material and a test method of film performance according to an embodiment of the invention.

An embodiment of the invention is described hereinafter. A method for manufacturing a water-based coating material according to an embodiment of the invention is first described referring to FIG. 1. FIG. 1 is a flow diagram showing a manufacturing method of a water-based coating material and a test method of film performance according to an embodiment of the invention.

In the water-based coating material according to the embodiment of the invention, carbon black as a "colored pigment", talc as an "extender pigment", and carboxylic acid-amine complex as a "corrosion inhibitor effective in an initial stage" were used. In addition, an epoxy ester resin, an acrylic resin emulsion, a polyurethane resin or a polyester resin was used as an "organic synthetic resin having a carboxyl group".

And zinc oxide particles having a specific surface area within a range of 20 to 60 m2/g and a particle size of 0.1 to 1 μm (which is an average particle size measured with a laser diffraction-type particle size distribution measuring apparatus) were used as a "zinc oxide particle". A method for producing zinc oxide particles comprises the steps of first mixing a water-soluble zinc material and an alkali material to react, and then performing water washing so as to remove impurities in a product, dehydrating, drying, burning, and pulverizing to classify it, and it permits obtaining zinc oxide particles having a great amount of fine asperities on a surface and a large specific surface area of an average particle size within a range of 0.1 to 1 μm measured with a laser diffraction-type particle size distribution measuring apparatus.

Furthermore, for comparison, water-based coating materials having a normal specific surface area using two kinds of zinc oxide particles (zinc oxide A, zinc oxide B) were also produced in a similar way and their characteristics were evaluated. Physical properties of zinc oxide particles (which have a large specific surface area) used for the water-based coating material according to the embodiment of the invention, zinc oxide A, and zinc oxide B are shown in TABLE 1.

TABLE 1

|  | zinc oxide (specific surface area; Large) | zinc oxide A | zinc oxide B |
|---|---|---|---|
| particle size [μm] | 0.1~1 | 0.1~1 | 0.1~1 |
| specific gravity | 2.5~3.5 | 5~6 | 3~4 |
| pH | 7~9 | 7~8 | 8~9 |
| specific surface area [m2/g] | 20~60 | 1~5 | 5~10 |

Here, the particle size means an average particle size measured with a laser diffraction-type particle size distribution measuring apparatus, and the specific surface area means a value calculated by a gas adsorption method (BET method). Among these, elements and combinations of seven kinds of water-based coating materials of Examples 1 to 7 according to the embodiment of the invention which are manufactured using zinc oxide particles having a large specific surface area are shown in the upper part of TABLE 2.

TABLE 2

| combination | Example 1 | Example 2 | Example 3 | Example 4 | Example 5 | Example 6 | Example 7 |
|---|---|---|---|---|---|---|---|
| resin A | 100 | 100 | 100 | — | — | — | 100 |
| resin B | — | — | — | 100 | — | — | — |
| resin C | — | — | — | — | 100 | — | — |
| resin D | — | — | — | — | — | 100 | — |
| water | 19 | 19 | 19 | 19 | 19 | 19 | 19 |
| carbon black | 5 | 5 | 5 | 5 | 5 | 5 | 5 |
| talc | 35 | 35 | 35 | 35 | 35 | 35 | 35 |
| zinc oxide (specific surface area; Large) | 9 | 4 | 20 | 9 | 9 | 9 | 9 |
| antifoamer | 0.4 | 0.4 | 0.4 | 0.4 | 0.4 | 0.4 | 0.4 |
| corrosion inhibitor effective in an initial stage | 1.1 | 1.1 | 1.1 | 1.1 | 1.1 | 1.1 | 1.1 |
| amine | — | — | — | — | — | — | 3 |
| hardness | F | HB | F | F | F | F | F |
| adhesion | pass | pass | pass | pass | pass | pass | pass |
| corrosion resistance (SST) | pass till 600 hours | pass till 480 hours | pass till 600 hours | pass till 360 hours | pass till 360 hours | pass till 360 hours | pass till 600 hours |
| water resistance | pass for 240 hours | pass for 240 hours | pass for 240 hours | pass for 240 hours | pass for 240 hours | pass for 240 hours | pass for 240 hours |
| storage stability (at 20 degree C. for 90 days) | ○ | ○ | ○ | ○ | ○ | ○ | ○ | resin A: WATERSOL EFD5501 made by DIC Corporation
resin B: VONCOAT EC740EF made by DIC Corporation
resin C: Super Flex 830 made by Dai-ichi Kogyo Seiyaku Co., Ltd.
resin D: Vylonl MD-1200 made by Toyobo Co., Ltd.
○ . . . no change in the paint property
Δ . . . slight change in the paint property
X . . . damage in the paint property Water as a solvent was added thereto to make six kinds of water-based coating materials of Examples 1 to 6. In addition, triethylamine as an amine was further added to make a water-based coating material of Example 7.

In addition, for comparison, elements and combinations of ten kinds of water-based coating materials of Comparative Examples 1 to 10 which are manufactured using zinc oxide A or zinc oxide B are shown in the upper part of TABLE 3.

TABLE 3

| combination | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 |
|---|---|---|---|---|---|---|---|---|---|---|
| resin A | 100 | 100 | 100 | 100 | — | — | — | — | — | — |
| resin B | — | — | — | — | 100 | 100 | — | — | — | — |
| resin C | — | — | — | — | — | — | 100 | 100 | — | — |
| resin D | — | — | — | — | — | — | — | — | 100 | 100 |
| water | 19 | 19 | 19 | 19 | 19 | 19 | 19 | 19 | 19 | 19 |
| carbon black | 5 | 5 | 5 | 5 | 5 | 5 | 5 | 5 | 5 | 5 |
| talc | 35 | 35 | 35 | 35 | 35 | 35 | 35 | 35 | 35 | 35 |
| zinc oxide A | 9 | — | 20 | — | 9 | — | 9 | — | 9 | — |
| zinc oxide B | — | 9 | — | 20 | — | 9 | — | 9 | — | 9 |
| antifoamer | 0.4 | 0.4 | 0.4 | 0.4 | 0.4 | 0.4 | 0.4 | 0.4 | 0.4 | 0.4 |
| corrosion inhibitor effective in an initial stage | 1.1 | 1.1 | 1.1 | 1.1 | 1.1 | 1.1 | 1.1 | 1.1 | 1.1 | 1.1 |
| hardness | HB | HB | HB | HB | HB | HB | HB | HB | HB | HB |
| adhesion | pass | pass | pass | pass | pass | pass | pass | pass | pass | pass |
| corrosion resistance (SST) | pass till 480 hours | pass till 480 hours | pass till 480 hours | pass till 480 hours | pass till 240 hours | pass till 240 hours | pass till 240 hours | pass till 240 hours | pass till 240 hours | pass till 240 hours |
| water resistance | pass for 240 hours | pass for 240 hours | pass for 240 hours | pass for 240 hours | pass for 240 hours | pass for 240 hours | pass for 240 hours | pass for 240 hours | pass for 240 hours | pass for 240 hours |
| storage stability (at 20 degree C. for 90 days) | ○ | ○ | ○ | ○ | Δ | ○ | X | Δ | Δ | Δ | resin A: WATERSOL EFD5501 made by DIC Corporation
resin B: VONCOAT EC740EF made by DIC Corporation
resin C: Super Flex 830 made by Dai-ichi Kogyo Seiyaku Co., Ltd.
resin D: Vylonl MD-1200 made by Toyobo Co., Ltd.
○ . . . no change in the paint property
Δ . . . slight change in the paint property
X . . . damage in the paint property Here, as an organic synthetic resin having a carboxyl group, in particular, WATERSOL EFD5501, which is an epoxy ester resin, made by DIC Corporation was used as resin A, VONCOAT EC740EF, which is an acrylic resin emulsion, made by DIC Corporation was used as resin B, Super Flex (a registered trademark) 830, which is an urethane resin, made by Dai-ichi Kogyo Seiyaku Co., Ltd. was used as resin C, and Vylonal (a registered trademark) MD-1200, which is a polyester resin, made by Toyobo Co., Ltd. was used as resin D.

A method for manufacturing a water-based coating material, as shown in FIG. 1, comprises the steps of first combining one-half quantity of an organic synthetic resin having a carboxyl group, one-half quantity of water as a solvent, carbon black as a colored pigment, talc as an extender pigment, zinc oxide particles, an antifoamer, and a corrosion inhibitor effective in an initial stage to form a premix, and then (S10) mixing the premix with a disperser for 30 minutes, (S11) milling it in a sand mill for one and a half hours, and (S12) stirring it for 30 minutes with the remaining one-half of the organic synthetic resin having a carboxyl group and the remaining one-half of the water.

Characteristic evaluation of seven kinds of water-based coating materials of Examples 1 to 7 and ten kinds of water-based coating materials of Comparative Examples 1 to 10 manufactured as described above was performed as shown in FIG. 1. That is to say, an untreated mild steel sheet (SPCC-SD) was subjected to solvent cleaning to degrease it (S13), and then a water-based coating material was applied to a surface of the steel sheet with an air spray so as to have a film thickness of 20 to 25 μm (S14), drying was carried out at 60 degree C. for 20 minutes (S15) and curing was carried out at 20 degree C. for 7 days (S16) so as to make a test specimen 3. With the test specimen 3, characteristic evaluation was performed (S17) and film performance was evaluated.

As the evaluation items, hardness, adhesion, corrosion resistance, water resistance, and storage stability were covered to perform the evaluation. Film hardness was first evaluated according to JIS-K5600-5-4. That is to say, pencil-hardness was measured with what is called a pencil hardness measurement equipment. In addition, film adhesion was evaluated according to JIS-K5600-5-6, that is to say, it made eleven lengthwise and crosswise cuts in a film surface of the test specimen with a cutter knife at 1 mm intervals so as to make total one hundred squares of a size of 1 mm .times. 1 mm, and then an adhesive cellophane tape was attached over to the top of the one hundred squares and rapidly peeled off, and the number of separated squares was counted. The number of separated squares of zero was judged to be a pass.

Moreover, corrosion resistance of the film was evaluated by SST (Salt Spray Test). In particular, it made a crosscut on the film surface of the test specimen and the test specimen was left under the salt spray condition according to JIS-Z2371 and taken out after 240, 360, 480, and 600 hours so as to measure each corrosion width on one side of the crosscut part using a salt spray testing machine. The one-sided corrosion width of less than 3.0 mm was judged to be a pass.

In addition, water resistance of the film was evaluated by conducting a peeling test with an adhesive cellophane tape after performing the steps of soaking the test specimen in pure water at 40 degree C. for prescribed hours and forming one hundred squares on the film according to the JIS-K5600-5-6. Furthermore, storage stability of the film was evaluated by observing changes in the paint property after leaving the manufactured water-based coating material at rest at 20 degree C. for 90 days. Data of ○ shows a case that had no change in the paint property, data of Δ shows a case that had a slight change in the paint property, and data of X shows a case that had damage in the paint property.

As a result, in the film hardness, as shown in the lower part of TABLE 2, each of Examples 1, 3 to 7 has a pencil hardness of F and it turned out that they had enough hardness as a film made by applying the water-based coating material. On the other hand, as shown in the lower part of TABLE 3, each of Comparative Examples 1 to 10 has a pencil hardness of HB and it was clear that they had lower hardness than that of each film made by applying water-based coating materials of Examples 1, 3 to 7.

Moreover, Example 2 has a pencil hardness of HB and it was clear that Example 2 had an equivalent hardness with that of Comparative Examples 1 to 10 in spite of a small additive amount of zinc oxide of 4 parts by weight.

In addition, in the film adhesion, as shown in lower parts of TABLE 2 and TABLE 3, each of Examples 1 to 7 and Comparative Examples 1 to 10 was judged to be a pass and it was found that there was no difference between the Examples and the Comparative Examples thereof.

Still moreover, in corrosion resistance of the film, as shown in the lower part of TABLE 2, Examples 1, 3, and 7 were passed till 600 hours in SST (Salt Spray Test), and Example 2 was passed till 480 hours, and Examples 4 to 6 were passed till 360 hours. It showed each of them had an excellent corrosion resistance thereof. On the other hand, as shown in the lower part of TABLE 3, Comparative Examples 1 to 4 were passed till 480 hours and showed corrosion resistance equivalent to that of Examples 1 to 7, respectively, and Comparative Examples 5 to 10 were passed till 240 hours and showed a slightly low corrosion resistance compared to that of Examples 1 to 7.

In addition, in water resistance of the film, as shown in lower parts of TABLE 2 and TABLE 3, each of Examples 1 to 7 and Comparative Examples 1 to 10 was passed for 240 hours and it was found that there was no difference between the Examples and the Comparative Examples thereof.

Furthermore, in storage stability of the water-based coating material, as shown in the lower part of TABLE 2, each of examples 1 to 7 was judged as ○ which shows a case that had no change in the paint property and it showed they had an excellent storage stability, respectively. On the other hand, as shown in the lower part of TABLE 3, Comparative Examples 1 to 4 and 6 were judged as ○ which shows a case that had no change in the paint property and showed storage stability equivalent to that of Examples 1 to 7, and Comparative Examples 5, 7 to 10 were judged as Δ which shows a case that had a slight change in the paint property or X which shows a case that had damage in the paint property and showed lower storage stability compared to that of Examples 1 to 7, respectively.

Above-described results were summed up that it was clear that water-based coating materials of Examples 1, 3 to 7 and those films obtained by applying the water-based coating materials of Examples 1, 3 to 7 had an excellent performance compared with water-based coating materials of Comparative Examples 1 to 10 and those films obtained by applying the water-based coating materials of Comparative Examples 1 to 10.

In addition, it was clear that the water-based coating material of Example 2 according to the embodiment of the invention and the film obtained by applying the water-based coating material of Example 2 had performance equivalent to that of water-based coating materials of Comparative Examples 1 to 4 and those films obtained by applying the water-based coating materials of Comparative Examples 1 to 4 and had performance greater than that of water-based coating materials of Comparative Examples 5 to 10 and those films obtained by applying the water-based coating materials of Comparative Examples 5 to 10 in spite of the small additive amount of zinc oxide of 4 parts by weight.

Thus, in water-based coating materials of Examples 1 to 7 according to the embodiment of the invention, composed mainly of an organic synthetic resin having a carboxyl group and zinc oxide particles, it permits obtaining a tough film having an excellent corrosion resistance even if the additive amount of zinc oxide particles are reduced less than that of conventional ones and obtaining a tougher film having a much excellent corrosion resistance by coupling a great amount of carboxyl groups to a surface of zinc oxide particles when making the additive amount of zinc oxide particles equal to that of conventional ones.

In the embodiment of the invention, as the "zinc oxide particles having a specific surface area within a range of 20 to 60 m2/g", zinc oxide particles having a great amount of fine asperities on surfaces and a large specific surface area produced by comprising the steps of mixing a water-soluble zinc material and an alkali materials to react, and then performing water washing so as to remove impurities in a product, dehydrating, drying, and pulverizing to classify it were used, however, if it meets the condition that the specific surface area is within a range of 20 to 60 m2/g, other zinc oxide particles produced in another way can be used also.

In addition, in the embodiment of the invention, the case that carbon black as the "colored pigment" and talc as the "extender pigment" were used is described, however, various other chemical compounds including titanium oxide, iron oxide, and so on can be used as the "colored pigment". Also, various other chemical compounds including calcium carbonate, barium sulfate, mica, silica, diatomaceous earth, and so on can be used as the "extender pigment".

In the practice of the invention, structures, compositions, combinations, elements, shapes, quantities, materials, dimensions, manufacturing methods, and so on of other parts of water-based coating materials are not limited to those of the embodiment of the invention and each of the examples. In addition, the numeric values which are described in the embodiment of the invention are not anything to indicate a critical value but to indicate the preferred values that are suitable for enforcement, and thus it is not anything to deny the embodiment even if the numeric values are slightly changed.

The invention claimed is:

1. A water-based coating material comprising:
    an organic synthetic resin having a carboxyl group;
    zinc oxide particles;
    water as a solvent; and
    a pigment; wherein
the zinc oxide particles have a specific surface area within a range of 20 to 60 m2/g.

2. The water-based coating material according to claim 1, wherein the organic synthetic resin having a carboxyl group is an epoxy ester resin, an acrylic resin emulsion, a polyurethane resin or a polyester resin.

3. The water-based coating material according to claim 2, further comprising:
    a glycol comprising at least one of propylene glycol, diethylene glycol, butyl cellosolve, propylene glycol monoether, diethylene glycol monoether, propylene glycol ether acetate, and diethylene glycol ether acetate, or an amine comprising at least one of triethylamine, dimethyl ethanolamine, and aqueous solution of ammonia.

4. The water-based coating material according to claim 1, further comprising:
    a corrosion inhibitor effective in an initial stage.

5. The water-based coating material according to claim 1, wherein the organic synthetic resin having a carboxyl group, the zinc oxide particles, and the water as a solvent are contained in an amount ranging from 40 to 70% by weight, 3 to 10% by weight, and 5 to 20% by weight, respectively, in the water-based coating material.

6. The water-based coating material according to claim 1, further comprising:
a glycol comprising at least one of propylene glycol, diethylene glycol, butyl cellosolve, propylene glycol monoether, diethylene glycol monoether, propylene glycol ether acetate, and diethylene glycol ether acetate, or an amine comprising at least one of triethylamine, dimethyl ethanolamine, and aqueous solution of ammonia.

7. The water-based coating material according to claim 2, further comprising:
a corrosion inhibitor effective in an initial stage.

8. The water-based coating material according to claim 3, further comprising:
a corrosion inhibitor effective in an initial stage.

9. The water-based coating material according to claim 2, wherein the organic synthetic resin having a carboxyl group, the zinc oxide particles, and the water as a solvent are contained in an amount ranging from 40 to 70% by weight, 3 to 10% by weight, and 5 to 20% by weight, respectively, in the water-based coating material.

10. The water-based coating material according to claim 3, wherein the organic synthetic resin having a carboxyl group, the zinc oxide particles, and the water as a solvent are contained in an amount ranging from 40 to 70% by weight, 3 to 10% by weight, and 5 to 20% by weight, respectively, in the water-based coating material.

11. The water-based coating material according to claim 4, wherein the organic synthetic resin having a carboxyl group, the zinc oxide particles, and the water as a solvent are contained in an amount ranging from 40 to 70% by weight, 3 to 10% by weight, and 5 to 20% by weight, respectively, in the water-based coating material.

12. The water-based coating material according to claim 1, wherein the zinc oxide particles having a specific surface area within a range of 20 to 60 m2/g are produced by:
mixing a water-soluble zinc material and an alkali material to react;
performing water washing to remove impurities, dehydrating, drying, burning, and pulverizing; and
producing the zinc oxide particles having the specific surface area within a range of 20 to 60 m2/g.

13. The water-based coating material according to claim 1, further comprising:
a glycol comprising one of propylene glycol, diethylene glycol, butyl cellosolve, propylene glycol monoether, diethylene glycol monoether, propylene glycol ether acetate, and diethylene glycol ether acetate, or an amine comprising one of triethylamine, dimethyl ethanolamine, and aqueous solution of ammonia.

14. The water-based coating material according to claim 2, further comprising:
a glycol comprising one of propylene glycol, diethylene glycol, butyl cellosolve, propylene glycol monoether, diethylene glycol monoether, propylene glycol ether acetate, and diethylene glycol ether acetate, or an amine comprising one of triethylamine, dimethyl ethanolamine, and aqueous solution of ammonia.

* * * * *